US008806458B2

(12) United States Patent
Glaister et al.

(10) Patent No.: US 8,806,458 B2
(45) Date of Patent: Aug. 12, 2014

(54) VECTORIZATION OF SHADERS (75) Inventors: Andy Glaister, Redmond, WA (US);
Blaise Pascal Tine, Lynnwood, WA (US); Blake Pelton, Redmond, WA (US); Derek Sessions, Bellevue, WA (US); Mikhail Lyapunov, Woodinville, WA (US); Yuri Dotsenko, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 240 days.

(21) Appl. No.: 13/398,797

(22) Filed: Feb. 16, 2012

(65) Prior Publication Data
US 2013/0219378 A1 Aug. 22, 2013

(51) Int. Cl.
*G06F 9/44* (2006.01)
(52) U.S. Cl.
USPC .......................................... 717/146; 717/149
(58) Field of Classification Search
CPC ............ G06F 8/456; G06F 8/45; G06F 8/443
USPC ................................................. 717/146, 149
See application file for complete search history.

(56) References Cited

U.S. PATENT DOCUMENTS

| 6,104,374 | A | 8/2000 | Sullivan et al. | |
|---|---|---|---|---|
| 7,466,318 | B1 | 12/2008 | Kilgard | |
| 7,530,062 | B2 | 5/2009 | Aronson et al. | |
| 2010/0042815 | A1* | 2/2010 | Gonion et al. | 712/222 |

OTHER PUBLICATIONS

Kessenich, "The OpenGL Shading Language", Aug. 7, 2008, pp. 107.*
Abrash, Michael, "Rasterization on Larrabee", Retrieved at <<http://software.intel.com/en-us/articles/rasterization-on-larrabee/>>, Published Jun. 3, 2009, Retrieved Date: Dec. 12, 2011, pp. 16.
Persson, Emil, "ATI Radeon™ HD 2000 programming guide", Retrieved at <<http://developer.amd.com/media/gpu_assets/ATI_Radeon_HD_2000_programming_guide.pdf>>, Developer Guides and Manuals, AMD, Inc., 2007, pp. 22.
Yang, et al., A GPGPU Compiler for Memory Optimization and Parallelism Management, Retrieved at <<http://www.eecs.ucf.edu/~zhou/pldi10.pdf>>, Proceedings of 2010 ACM SIGPLAN Conference on PLDI, Jun. 2010, pp. 86-97, ACM, New York.
Karrenberg, R., et al., "AnySL: Efficient and Portable Shading for Ray Tracing", Retrieved at <<http://graphics.cg.uni-saarland.de/fileadmin/cguds/papers/2010/karrenberg_hpg2010/karrenberg_hpg2010.pdf>>, Proceedings of the Conference on High Performance Graphics, Jun. 25-27, 2010, pp. 97-105, Eurographics Association, Switzerland.
Karrenberg, et al., "Whole-Function Vectorization", Retrieved at <<http://ieeexplore.ieee.org/stamp/stamp.jsp?tp=&arnumber=5764682>>, Code Generation and Optimization (CGO) 2011 9th Annual IEEE/ACM International Symposium, Apr. 2-6, 2011, pp. 141-150.

* cited by examiner

*Primary Examiner* — Li B Zhen
*Assistant Examiner* — Duy Khuong Nguyen
(74) *Attorney, Agent, or Firm* — Aaron Chatterjee; Andrew Sanders; Micky Minhas (57) ABSTRACT

Intermediate representation (IR) code is received as compiled from a shader in the form of shader language source code. The input IR code is first analyzed during an analysis pass, during which operations, scopes, parts of scopes, and if-statement scopes are annotated for predication, mask usage, and branch protection and predication. This analysis outputs vectorization information that is then used by various sets of vectorization transformation rules to vectorize the input IR code, thus producing vectorized output IR code.

20 Claims, 12 Drawing Sheets

```
struct Scope {

// the main mask of the scope to predicate operations
    CMask MainMask;

union { struct {
            // true-branch mask
            CMask TBMask;
            // false-branch mask
            CMask FBMask;
        } If;

struct {
            // the value of switch condition, computed on entry to switch
            CMask SelectorMask;

// whether to execute the default clause
            CMask TakeDefaultMask;

// the initial value of the parent scope that nests Switch
            CMask InitialParentMask;
        } Switch;

struct {
            // whether to continue to the next iteration or exit the loop
            CMask KeepLoopingMask;
        } Loop;

```
Loop {
    ...
208     // a block to compute
        loop condition cond
    ...
} EndLoop(cond)
```

173 loop-scope

On entry to a Loop-scope:                                          210 declare Scope.MainMask variable;
if(loop has a continue)
   declare Scope.Loop.KeepLoopingMask variable;
else
   alias Scope.Loop.KeepLoopingMask to Scope.MainMask; // they refer
to the same IR variable // Before the loop, initialize the KeepLoopingMask
Scope.Loop.KeepLoopingMask = ParentScopeMask;

if(loop has a continue)
   // Update Scope.MainMask as the very first operation of the Loop.
   Scope.MainMask = Scope.Loop.KeepLoopingMask;

---

On exit from the loop – EndLoop:                                   212

Scope.Loop.KeepLoopingMask = Scope.Loop.KeepLoopingMask & cond;
cond = Scope.Loop.KeepLoopingMask;

---

On unconditional Break and Continue and conditional BreakC(cond) and
ContinueC(cond):

if(Break or Continue)
   TempMask = ~ParentScopeMask;                                    214
else
   TempMask = ~(ParentScopeMask & cond);
RestrictNestingScopes(OpLoop, TempMask);
if(Break or BreakC)
   Scope.Loop.KeepLoopingMask = Scope.Loop.KeepLoopingMask &
TempMask;

```
switch(cond) {
  case c1:
  case c2:
    ...
    break;         216
  default:
    ...
}
```

↓

174 switch scope

On entry to a Switch-scope:                                   218

Scope.Switch.SelectorMask = cond;     // because cond variable may
                                                 change inside Switch
Scope.Switch.TakeDefaultMask = ParentScopeMask;
Scope.Switch.InitialParentMask = ParentScopeMask;

On entry to a switch-case region:                             220

Scope.MainMask = (Scope.Switch.SelectorMask == c1) ||
        (Scope.Switch.SelectorMask == c2);
Scope.MainMask = Scope.MainMask & Scope.Switch.ParentScopeMask;
Scope.Switch.TakeDefaultMask = Scope.Switch.TakeDefaultMask &
Scope.MainMask;

On entry to switch-default region:                            222

Scope.MainMask = Scope.Switch.TakeDefaultMask;

On unconditional SwitchBreak and conditional SwitchBreakC(cond):   224 if(SwitchBreak)
    TmpMask = ~ParentScopeMask;
else
    TmpMask = ~(ParentScopeMask & cond);
RestrictNestingScopes(OpSwitch, TmpMask);

FIG. 10 on unconditional return (e.g. ret), conditional return (e.g., retc(cond)) 180

```
if(ret)
    TmpMask = ~ParentScopeMask;
else
    TmpMask = ~(ParentScopeMask & cond);
RestrictNestingScopes(OpSub, TempMask);
```

… # VECTORIZATION OF SHADERS

BACKGROUND

Shaders written in a shader language expose parallelism through the programming model of the shader langue. A scalar shader program is written for a single element (e.g., a pixel, a vertex, a thread, etc.), but several independent elements can be processed by the same program simultaneously. While GPU (graphics processing unit) hardware is designed to accommodate this programming or execution model, when a software (CPU-based) rasterizer is used in place of a GPU, the software rasterizer must pack independent computations efficiently to deliver reasonable performance on a CPU. That is, a shader program transformed for CPU execution should exploit CPU vector instructions, available in most modern CPUs, to attain up to W times increase in performance, where W is the vector width of the CPU. Such packing will be referred to herein as vectorization, and may involve both transforming the original program to a suitable form (described herein) and properly laying out resources in memory.

Vectorization of shader code compiled for a GPU (i.e., intermediate representation (IR) code, bytecode, etc.) is non-trivial in the presence of control flow logic, especially for compute shaders, due to possible divergence of execution for elements processed together. The vectorization task is further complicated by the desirability of running such an algorithm with high speed and while not overly increasing the size of the IR code, thus allowing for just-in-time (JIT) compiling of the vectorized IR code to native executable machine code. In addition, the vectorized IR code should be suitable for traditional compiler optimizations.

Techniques related to efficient vectorization of IR code compiled from shader language code while assuring correctness are discussed below.

SUMMARY

The following summary is included only to introduce some concepts discussed in the Detailed Description below. This summary is not comprehensive and is not intended to delineate the scope of the claimed subject matter, which is set forth by the claims presented at the end.

Intermediate representation (IR) code is received as compiled from a shader in the form of shader language source code. The input IR code is first analyzed during an analysis pass, during which operations, scopes, parts of scopes, and if-statement scopes are annotated for predication, mask usage, and branch protection and predication. This analysis outputs vectorization information that is then used by various sets of vectorization transformation rules to vectorize the input IR code, thus producing vectorized output IR code.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Terminology

The following terms used herein are defined as follows. A "program" is a sequence of operations. An "element" (e.g., pixel, thread, etc.) refers to a single invocation of scalar shader code. An operation is in "uniform control flow" ("UCF") if and only if it can be statically proven via compiler analysis that all elements must execute the operations or the operation is never executed (i.e., it is dead code); otherwise, an operation is in "divergent control flow" (DCF). A value (of a variable) is called a "single-value" if and only if it can be statically proven that the value is the same for all elements; otherwise the value is called "multi-value". A transfer, e.g., if(Cond), is said to be "uniform" if and only if the statement is in UCF and the condition of the transfer, if any, is single-valued. "Blending" of a vector value Dst=blend(Src1, Src2, Mask) defines the result as having components of Src1 for non-zero components of Mask and components of Src2 for zero components of Mask; the entire Dst vector is written.

"Predication" of a memory access is stronger than blending and defined for both read and write; i.e., only active scalar components are accessed. Each component of Mask is a 32-bit integer and can either be 0xFFFFFFFF or 0 for True and False, respectively (these bit sizes and values are only examples). At every point in a program, the value of the execution mask determines which elements are active (must produce a result); if a component of the mask is True—the corresponding element is active. At every point in the program, the value of active-element mask, used to handle partially-filled vectors, determines real and padding elements; if a component of the mask is True—the corresponding element is real. A "basic block" is a (maximum-length) sequence of operations that are always executed together; if control enters the sequence, each operation is executed in order until the last operation. A "thread loop" (t-loop) is a region of a compute shader, induced by the original synchronization barriers, that must be executed by all threads of a thread block before control can proceed to another thread loop; thread loops partition the compute shader such that the transformed program respects proper nesting of control-flow constructs.

Overview

Vectorization transforms described herein may take an input shader program in a shader language such as High Level Shader Language (HLSL) or OpenGL Shader Language (GLSL) and transform the program into a form that can correctly process up to W independent elements on a CPU (not a GPU) utilizing vector instructions. A vectorizer performing such transforms explicitly manages a set of predicates (masks) to correctly merge (blend or predicate) vector values in the presence of divergent control flow. The vectorizer relies on control-flow type analysis, liveness analysis, hints, and heuristics to minimize the number of necessary merge operations and to aid the following optimization passes, such as by a register allocator.

The vectorization pass is performed on scalar Intermediate Representation (IR) corresponding to the Intermediate Language (IL) binary shader code produced by a shader language compiler (and pre-optimized) from an original shader in a shader language. Note that even though the original shader in the shader language source code may be vectorized for a single element to be executed on a GPU, such vectorization is often poorly suitable for efficient mapping onto a CPU vector instruction set; therefore, the shader is first "un-vectorized". The vectorizer takes the scalar IR and augments it with mask management and vector blend operations. To do so efficiently, the vectorizer expects that: (c) each basic block is annotated by a set of variables that are live after the basic block, (a) each operation is annotated with a control-flow type which is either uniform or divergent, and (b) each value is classified as either a single-value or multi-value. To simplify the description, it is assumed that every variable is 32 bits; it is trivial to extend the concepts to other variable sizes.

One of the challenges of vectorization is to compute an execution mask for each operation in the shader program to properly merge new and old values, if necessary. CPUs do not have true hardware predication for vector instructions and an instruction typically computes all components of a vector. This may be harmless for an arithmetic operation in registers, but care should be taken when the result is written to memory. An operation in UCF has valid inputs and produces valid outputs that are safe to store to memory. However, an operation in DCF has valid inputs and computes valid outputs only for active elements; the value of outputs for inactive elements must not be changed in memory. To ensure this property, two mechanisms may be used—blending and predication that require the same execution mask. When writing a live variable or padded resource in memory, the newly-computed value and the old value are blended in memory; reading a variable or a padded resource is always safe because there is a valid memory location. Reads and writes of some memory resources (e.g., SRVs, UAVs, etc.) require predication; i.e., the active components must be accessed in scalar fashion due to potential data races, lack of scatter/gather instructions, or buffer limits. Not all outputs of a DCF operation need blending; e.g., a compiler-generated helper variable may not need merging because results of inactive invocations are never used, say beyond a current basic block.

Vectorization Algorithm

Vectorization is applied to a vectorization region. For any shader (except compute) each subroutine has a single region—the entire subroutine; a subroutine of a compute shader may have many such regions, each one corresponds to a thread loop. Before vectorization, compute shaders must be transformed to replace synchronization barriers (a shader language source code construct) with thread loops. Each region is first analyzed and then transformed, which is referred to as "vectorized". Both passes operate on IR with properly nested scopes such as if-scope, switch-scope, loop-scope, and t-loop-scope. It will be assumed that each nested scope has a pointer to its parent scope.

Main principles of embodiments of a vectorization algorithm will now be discussed, with particular implementation details added further below.

First, note that DCF requires predication to correctly merge vectors, while UCF does not. However, certain UCF may be selected to predicate, e.g., short If-statements, without nested control-flow transfers. Predicated transfers are discussed as a main challenge, because if a control transfer is uniform and non-predicated, a jump to the corresponding location can simply be generated.

Second, control-transfer operations such as break, continue, and return, do not change predication state outside of their respective scopes. Our implementation uses helper scope predicates that memorize predication state before a scope and restore it after the scope. Note that a scope may be unpredicated on entry, but may become predicated at some point.

Third, a protective branch may be used to guard a predicated sequence of operations, say if it is long, to skip over the sequence if the predication mask is false for all elements; this is an optimization and is not required for correctness. A protective branch may be always used if a sequence contains a control-transfer operation, an expensive operation (e.g., division), or contains too many operations.

Fourth, predicated control-transfer operations propagate predication to scopes where the operation is nested up to the parent scope of the operation or a nesting thread loop. Some examples are now presented to aid understanding.

First example, for a simple if-statement with divergent control transfer:

```
...                    // UCF, non-predicated
if(c)                  // UCF, c is multi-valued, predicated (no
                       choice), do not use protective branch
    x = x + 1;         // DCF, predicated
    x = y + x;         // DCF, predicated
else                   // DCF, predicated
    y = y - x;         // DCF, predicated
endif                  // DCF, predicated
...                    // UCF, non-predicated
```
which is then transformed to
```
m1 = c;                // true-branch mask
m2 = ~c;               // false-branch mask
t1 = x + 1;            // t1 is a temporary for x
t1 = y + t1;           // use temporary for x instead of x
x = blend(t1, x, m1);  // merge vector-value for x
t2 = y - x;            // t2 is a temporary for y
y = blend(t2, y, m2);  // merge vector-value for x
```

Second example, for a simple if-statement with the common blend case:

```
...                    // UCF, non-predicated
if(c)                  // UCF, c is single-valued, electively predicated, do
                       not use protective branch
    x = x + 1;         // UCF, predicated
    x = y + x;         // UCF, predicated
else                   // UCF, predicated
    x = y - x;         // UCF, predicated
endif                  // UCF, predicated
...                    // UCF, non-predicated
```
is transformed to
```
m1 = c;                              // true-branch mask
t1 = x + 1;            // t1 is a temporary for x in the true branch
t1 = y + t1;           // use temporary for x instead of x
t2 = y - x;            // t2 is a temporary for x in the false branch
x = blend(t1, t2, m1); // merge vector-value for x
```

For a third example, a conditional return nested in an if-statement:

```
B0                     // UCF, non-predicated (B denotes a basic
                       block)
if(c1)                 // UCF, c1 is single-valued, non-predicated, use
                       branch
    B1                 // UCF, non-predicated
    ret(c2);           // UCF, c2 is multi-valued, predicated
    B2                 // DCF, predicated
else                   // UCF, predicated, do not use branch
    B3                 // UCF, predicated (e.g., simple
                       sequence)
endif                  // DCF, predicated (due to return)
B4                     // DCF, predicated (due to return)
```
is transformed to
```
m1 = properly initialized; // subroutine-scope mask
B0                         // non-predicated
```

```
    m2 = c1;          // true-branch mask
    m3 = ~c1 ;        // false-branch mask
    if(any component of m2 is true)        // protective branch
       for the true-branch
       B1             // non-predicated
       tmp = ~(m2 & c2);    // what elements really
                              executed return (inverted)
       m2 = m2 & tmp;  // to mask-out inactive
                         invocations up to the
                         end of the true-branch
       m1 = m1 & tmp;  // to mask-out inactive
                         invocations up to the
                         end subroutine
       B2             // predicated with m2
    endif
    B3     // false-branch, predicated with m3, no protective
             branch
    B4     // after endif, predicated with m1
```

Figure 1:
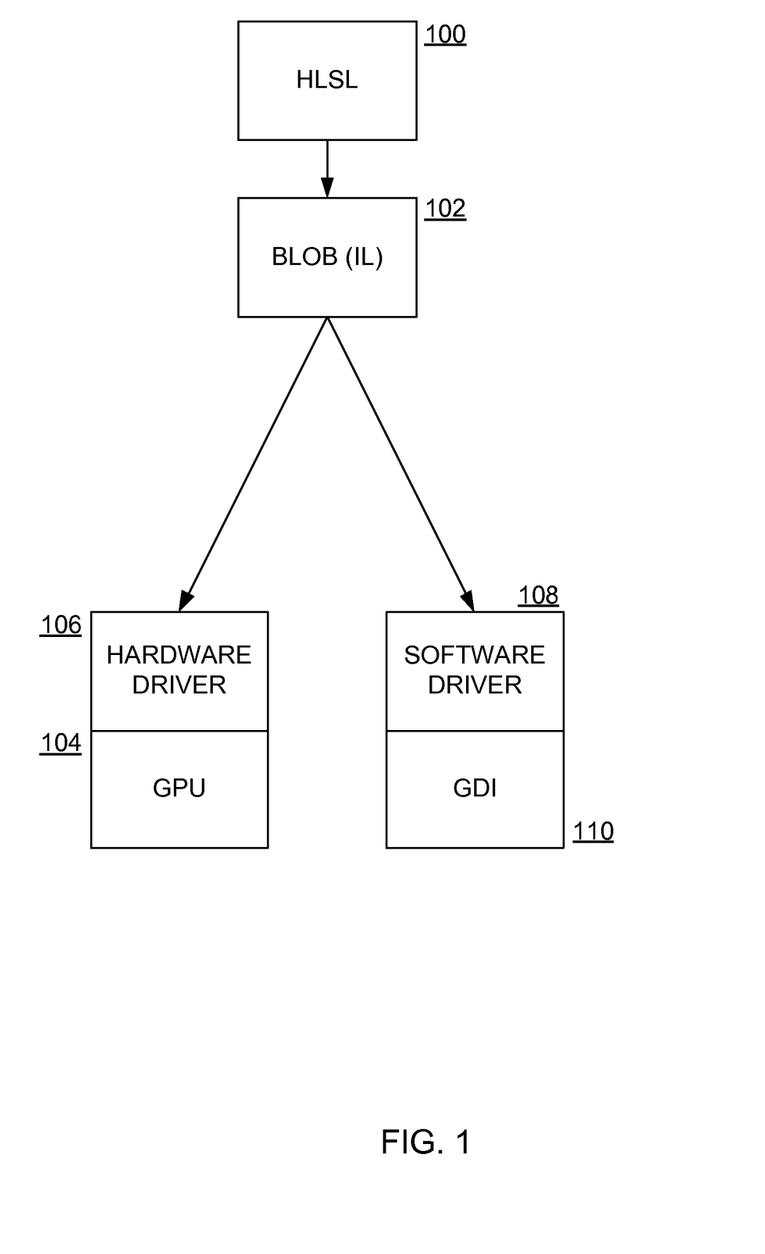
FIG. 1 shows a vectorization context.

Before proceeding with detailed discussion of vectorization, an overview of the vectorization context is provided. FIG. 1 shows a vectorization context. A shader 100 written in a shader language is compiled into IR or IL code 102, which in the example of HLSL (and Direct3D™) may be in the form of a blob. In the case where a GPU 104 is to be used, the IL code 102 is passed to a corresponding hardware driver 106 that communicates with the GPU 104 to execute the IL code 102. In the case where GPU 104 is not to be used, and instead rendering is to be performed by software running on a CPU, a software driver 108 translates the IL code 102 to machine language instructions which are executed by the CPU, which in turn may communicate with a graphics device interface (GDI) 110 to output corresponding graphics. More specifically, the software driver 108 may have a vectorizing component as described herein that transforms the IL code 102 to vectorized IL code 102 fitted to a vector width of the CPU, thus allowing vectorization features of the CPU to be used efficiently. The vectorized IL code is then passed to a just-in-time compiler that compiles the vectorized IL code into CPU instructions. For additional details about the operating context of a software-based rasterizer, see documentation regarding the Windows Advanced Rasterization Platform (WARP)™, such documentation is available elsewhere.

Figure 2:
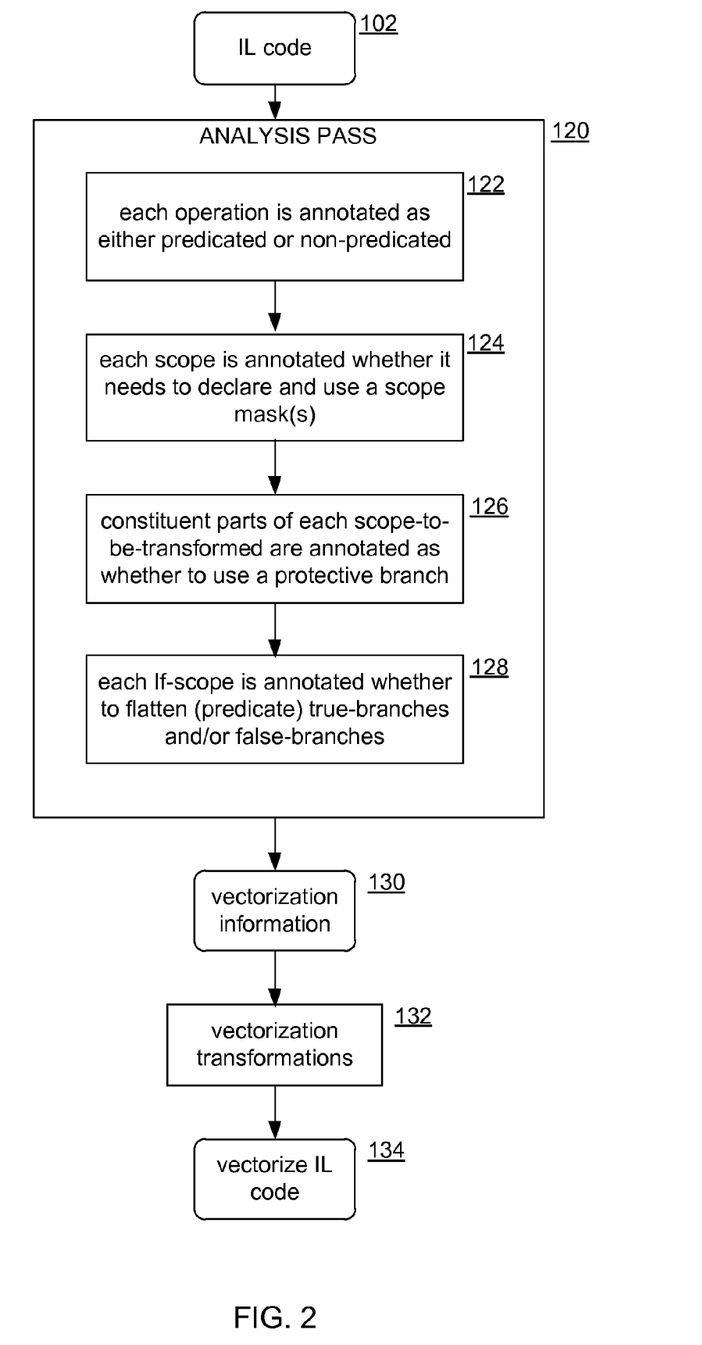
FIG. 2 shows an overview of a vectorization process.
Figure 3:
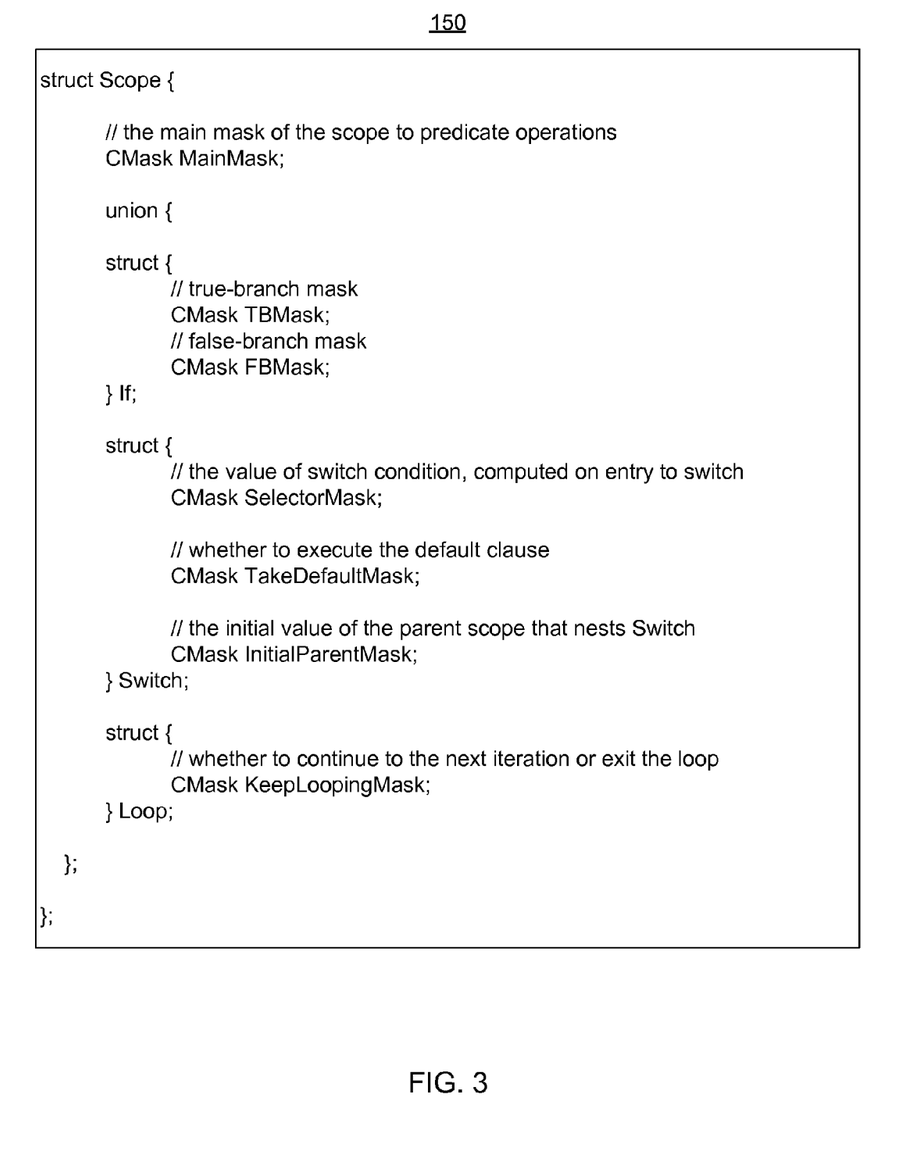
FIG. 3 shows a mask data structure.

FIG. 2 shows an overview of a vectorization process. Input IL code 102 is received and an analysis step 120 is performed. The analysis step 102 may involve a step 122 in which each operation is annotated as either predicated or non-predicated. At step 124, each scope (e.g., scope of a basic block, subroutine, if-statement, switch, etc.) is annotated as to whether the scope needs to declare and use any scope masks. At step 126, parts of each scope that is to be transformed are annotated as to whether to use a protective branch. At step 128, each scope that is an if-scope is annotated whether to flatten (predicate) true-branches and/or false-branches. The analysis step 120 outputs the annotations as vectorization information 130. The vectorization information 130 is then passed to vectorization transformations 132 which use the vectorization information 130 to transform the input IL code 102 to vectorized IL code 134. In one embodiment, the vectorization information 130 may be in the form of instances of a data structure 150, shown in FIG. 3. The data structure 150 can be used to store the various scope masks, predication masks, and other masks discussed herein. The various fields of the data structure 150 function as described in FIG. 3, and as further explained below.

Figure 4:
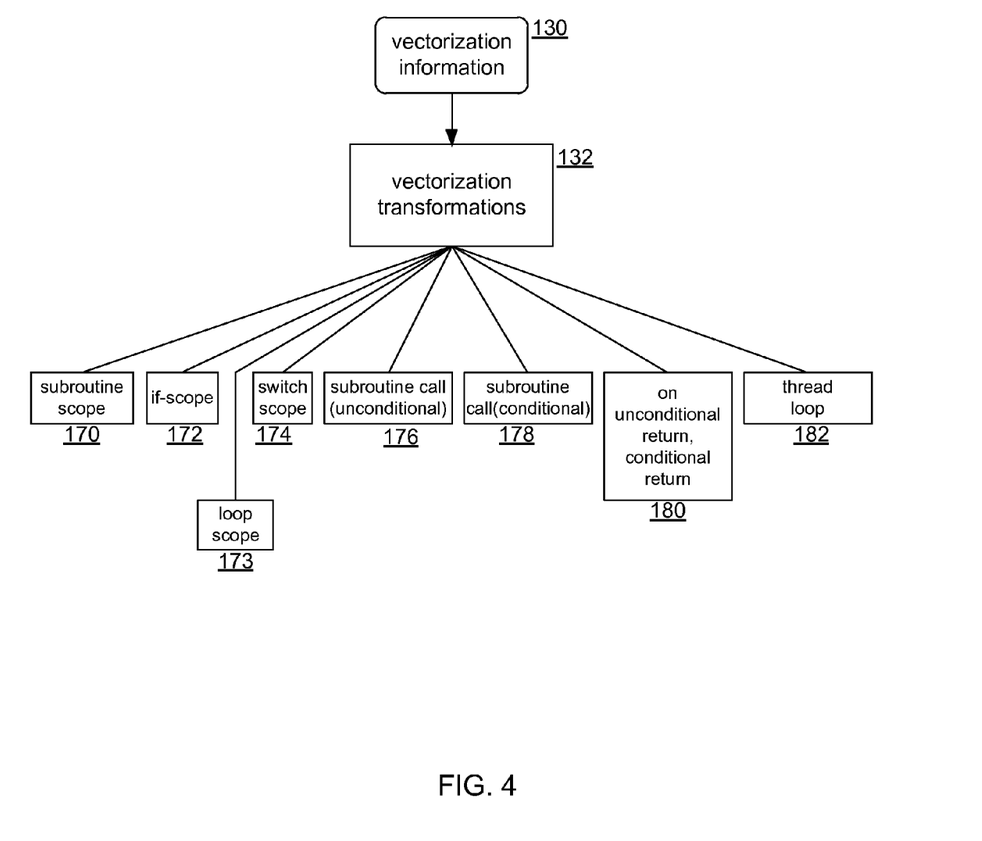
FIG. 4 shows various vector transformations, each corresponding to a different type of scope.

FIG. 4 shows various vector transformations, each corresponding to a different type of scope identified in the analysis step 120. The operation sequence, representing a subroutine, is analyzed in sequential order and a corresponding vectorizer is selected and used according to the type of a scope. According to the type of a scope, a corresponding vectorizer is used, either: a subroutine scope vectorizer 170, an if-scope vectorizer 172, a loop scope vectorizer 173, a switch-scope vectorizer 174, an unconditional subroutine call vectorizer 176, a conditional subroutine call vectorizer 178, a return vectorizer 180, or a thread-loop vectorizer 182. The vectorizers may be thought of as a set of rules for each scope and control-transfer operations, which emit corresponding operations into the output IL code 134. Where a ParentScopeMask is used, this may refer to the mask of the scope that nests the current scope. If a ParentScopeMask is accessed when undefined, it is assumed to be a TrueMask (a mask where all components are true).

Figure 5:
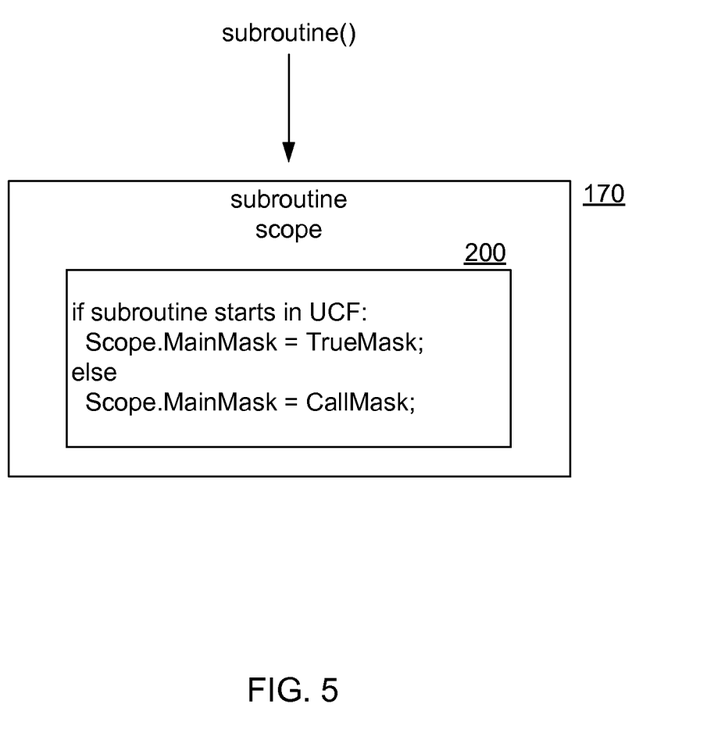
FIG. 5 shows a scope vectorizer.

FIG. 5 shows scope vectorizer 170. The scope vectorizer 170 is invoked for a scope for a subroutine. Subroutine rules 200 are self-explanatory: when a subroutine starts in UCF, then the corresponding scope's MainMask is set to true, otherwise, the MainMask is set to the mask of the scope of the subroutine's caller (CallMask).

Figure 6:
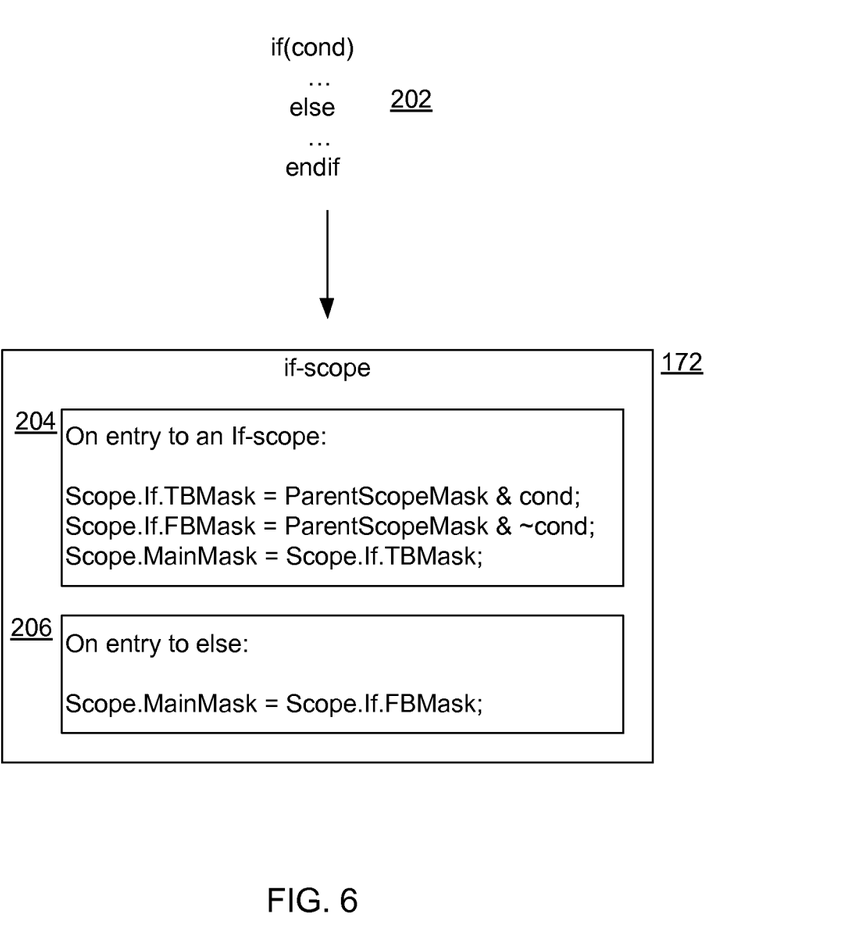
FIG. 6 shows an if-scope vectorizer.

FIG. 6 shows if-scope vectorizer 172. The if-scope vectorizer 172 is invoked for an if-statement 202. A first set of if-scope rules 204 are invoked when an if-scope is entered; the true-branch mask (TBMask) is set to the bitwise AND of the ParentScopeMask (mask of the scope containing the if-statement's scope) and the bitwise condition value ("cond") of the if-statement 202 (for discussion of bitwise operations, 0xFFFFFFFF is true and 0x0 is false). Similarly, the false-branch mask ("FBMask") is set to the conjunction of the ParentScopeMask and the bitwise negation of the condition value. The main mask is set to the value of the true-branch mask. A second set of if-scope rules 206 are invoked on entering the else portion of the if-statement 202, namely, the main mask is set to the false-branch mask of the current if-scope.

Figure 7:
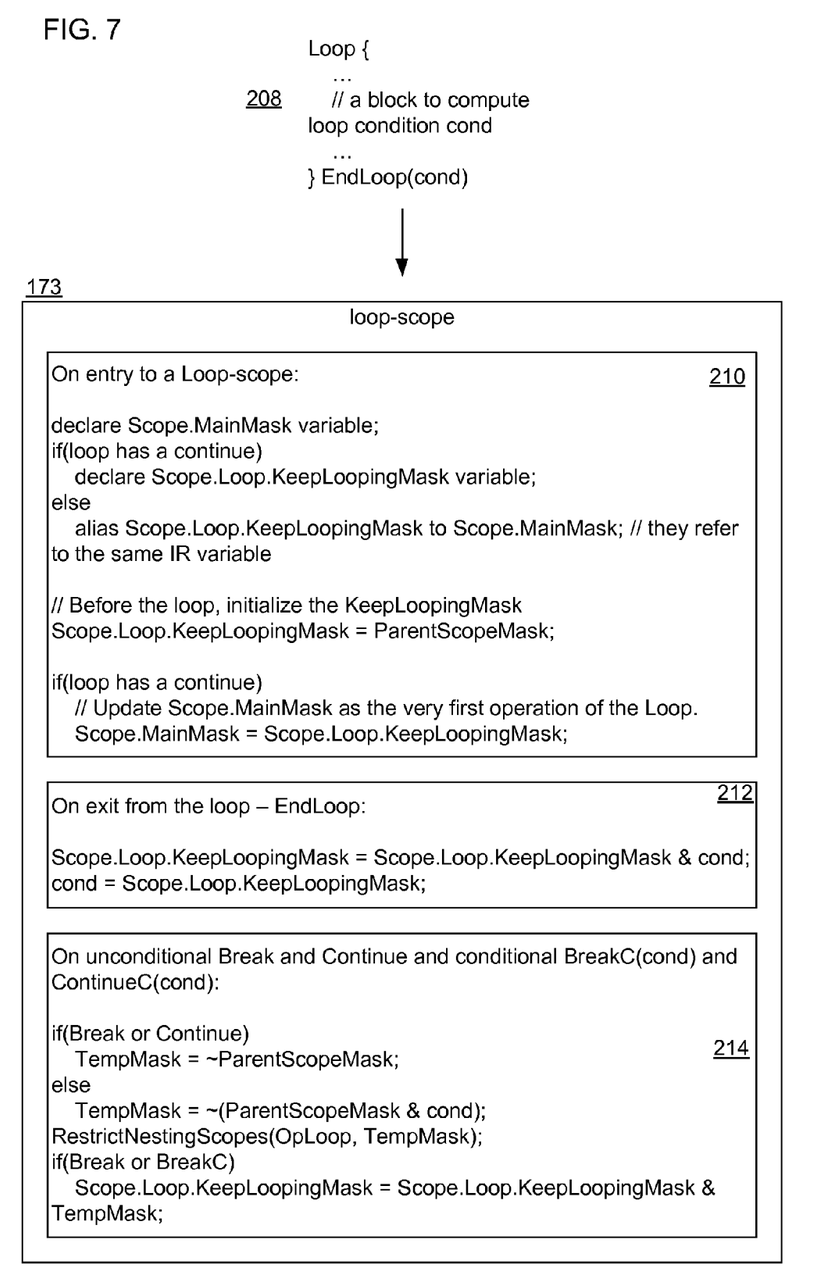
FIG. 7 shows a loop scope vectorizer.

FIG. 7 shows loop scope vectorizer 173. The loop scope vectorizer 173 is invoked for various forms of a loop statement 208 (while loops with post-conditions are discussed, it is trivial to convert a pre-condition loop to a post-condition loop). On entry to a loop-scope (the scope containing loop statement 208), a first set of loop rules 210 are applied. As can be seen, various masks are declared, and set according to the parent scope's scope mask. A keep-looping mask ("KeepLoopingMask") is also set and used in a second set of loop rules 212 and a third set of loop rules 214. The aliasing of the keep-looping mask to the scope's main mask refers to pointing the same IR code variables (mask variables) to a same memory location. Note that mask assignments can depend on whether the loop statement 208 has a continue construct. On exiting from the loop statement's scope, the second loop rules 212 are invoked, where the final value of the keep-looping mask depends on the current value and the loop condition, and the final value of the loop condition can be set to the keep-looping mask. The third set of loop rules 214 handle various break and continue occurrences. The RestrictNestingScopes( ) function is also used in other vectorizers and is described further below.

Figure 8:
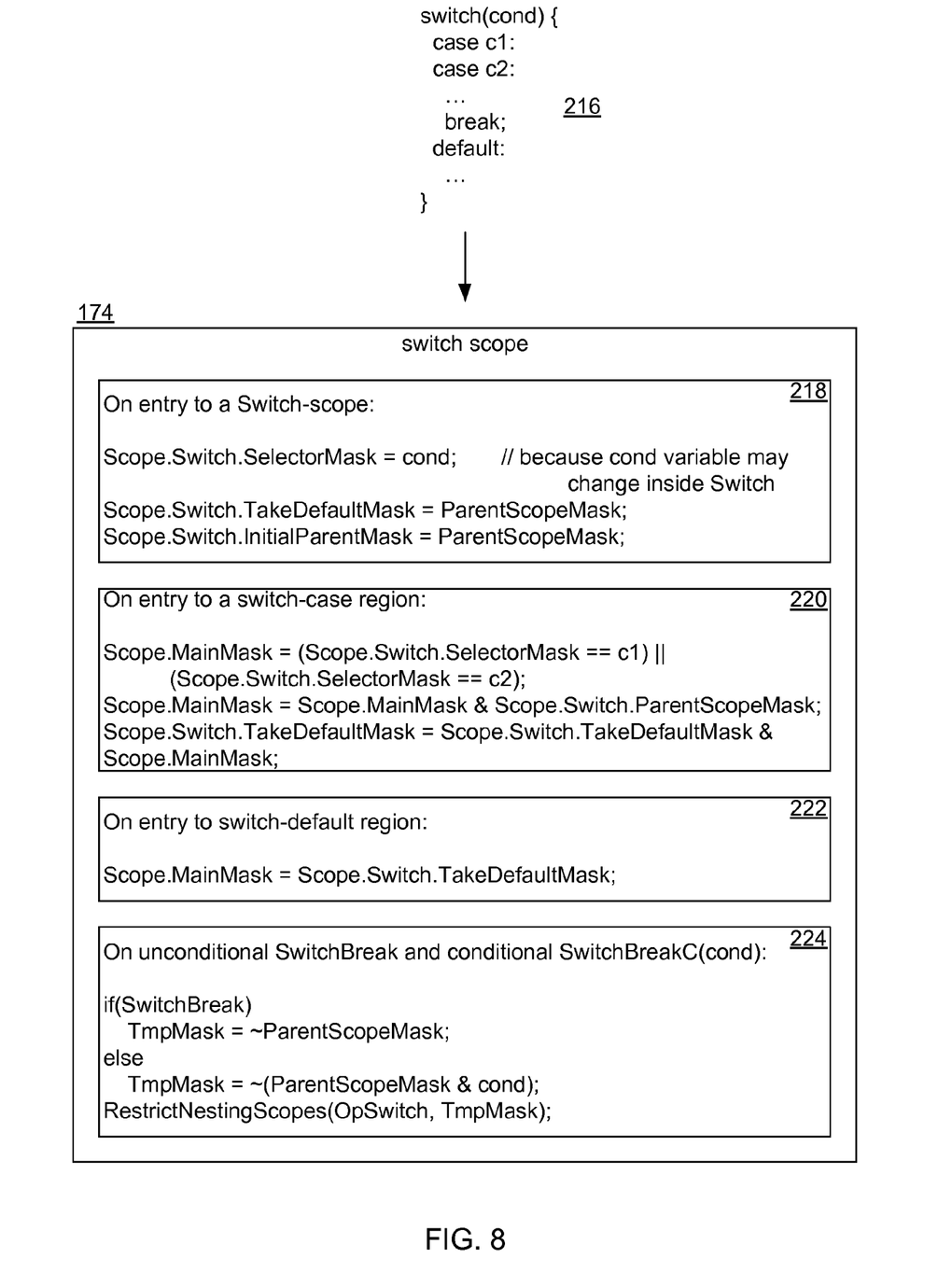
FIG. 8 shows a switch-scope vectorizer.

FIG. 8 shows switch-scope vectorizer 174. switch-scope vectorizer 174 is invoked for a switch statement 216. As with other vectorizers, the rules that are invoked may depend on the relevant scope, region, etc. A first set of switch-scope rules 218 are invoked upon entering the scope of switch statement 216, which sets various initial mask values. Upon entry to a switch-case region (i.e., a switch case such as case c1), a second set of switch-scope rules 220 are applied. Note that the switch statement's scope main mask can depend on the selector mask, the values of the switch case conditions, the parent scope mask, and/or the take-default mask. Upon entering the switch-default region a third set of switch scope rules 222; at least the main mask is set to the take-default mask. Finally, upon breaking from the switch scope, a fourth set of switch scope rules are used for vectorization.

Figure 9:
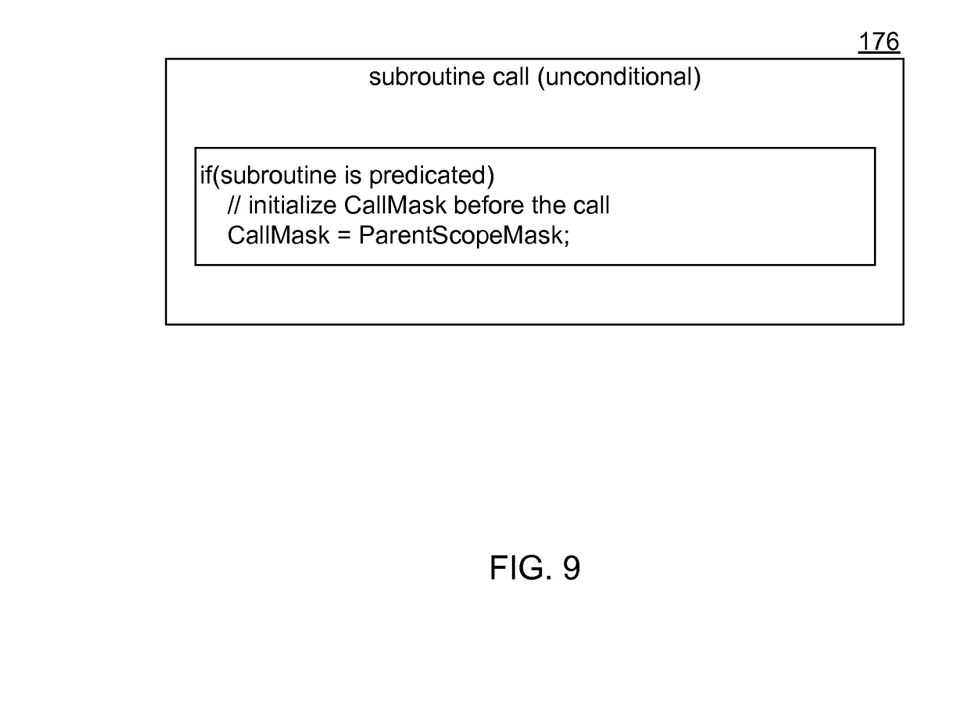
FIG. 9 shows an unconditional subroutine call vectorizer.

FIG. 9 shows unconditional subroutine call vectorizer 176. The unconditional subroutine call vectorizer 176 is used when a subroutine is predicated and causes the call mask to be set to the value of the scope mask of the subroutine call's parent scope.

Figure 10:
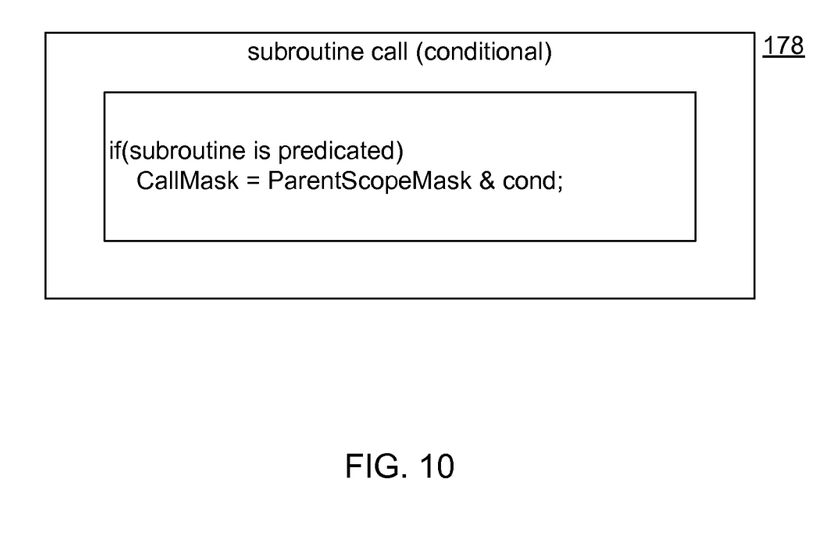
FIG. 10 shows a conditional subroutine call vectorizer.

FIG. 10 shows conditional subroutine call vectorizer 178, which is invoked for a conditional subroutine call, and which sets the call mask to the bitwise AND of the parent's scope mask and the conditional call condition value.

Figure 11:
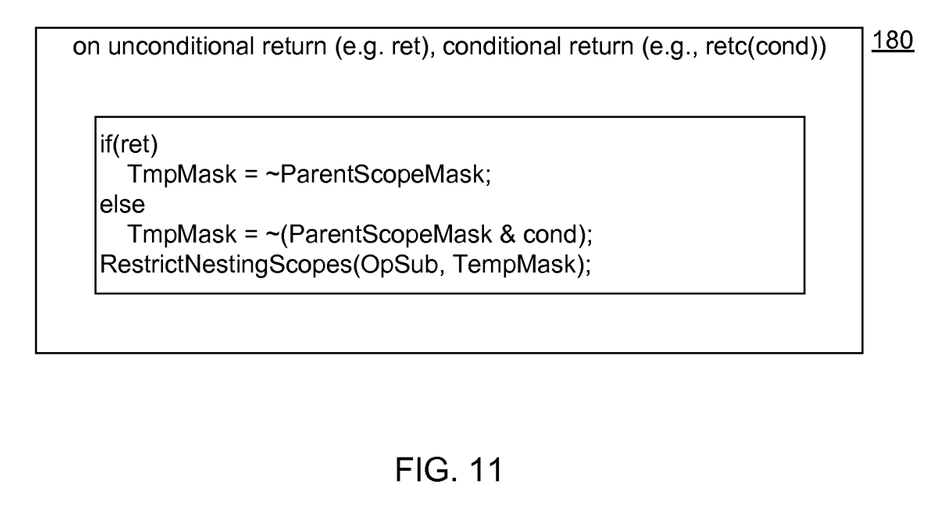
FIG. 11 shows a return vectorizer.

FIG. 11 shows return vectorizer 180. Upon various branch returns, a temporary mask is set per the parent's scope mask and possibly based on a condition of the return.

Figure 12:
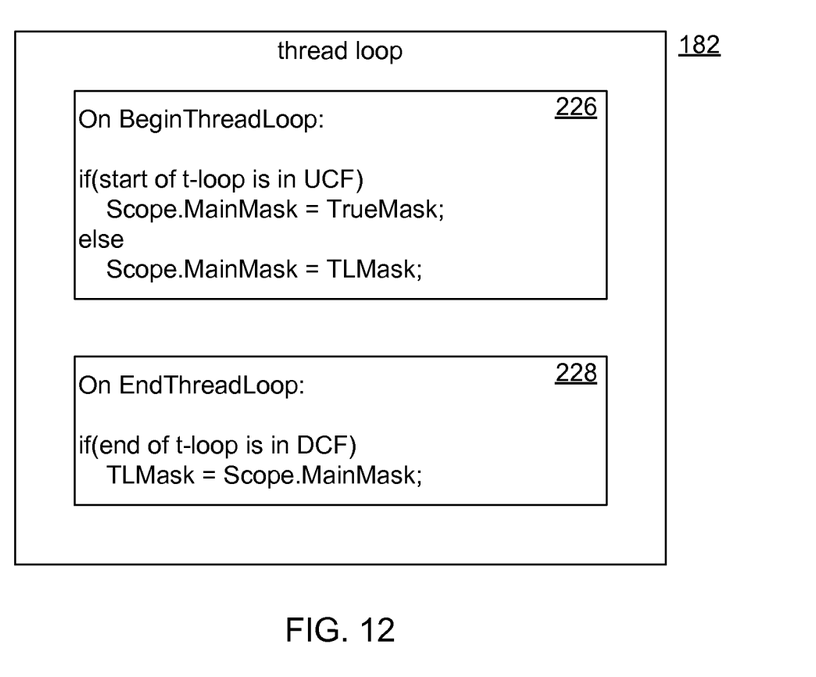
FIG. 12 shows a thread-loop vectorizer 182.

FIG. 12 shows thread-loop vectorizer 182. A first set of thread loop rules 226 is used when a thread loop starts, and the main mask is set to a true mask or a thread-loop mask based on whether the start of the thread loop is in UCF. When the thread loop ends, a second set of thread loop rules 228 are applied; if the end of the thread loop is in DCF, then the thread loop mask is set to the main mask.

The RestrictNestingScopes function can be implemented as follows:

RestrictNestingScopes(OpEndScope,Mask)
    Scope=current scope;

do

Scope.MainMask=Scope.MainMask & Mask;

Scope=parent scope;

while(not the final scope OpEndScope or t-loop) Restrict-NestingScopes updates predication/blending masks of the scopes that nest the control-flow transfer operation, with the effect being propagated up to the scope to which the control-flow transfer operation belongs (OpEndScope).

Reduction and Optimization of Blends and Temporaries

Besides computing the scope predicates properly, the vectorizer should also generate efficient IR code. A few techniques can be used to reduce the number of blend operations. Variables should also be reused as much as possible to keep the IR code size manageable. The following techniques may be helpful.

(a) Because scope predicates are valid only within the corresponding scopes, the mask variables may be reused whenever safe. A stack may be used to keep track of what masks are in use at every point of transformation; as the vectorization algorithm leaves a scope, the scope's mask variable is recycled to be reused later. With this observation, note that the upper bound on the number of masks is $O(D*S)$, where D is the maximum allowed nesting level of control flow, and S is the number of subroutines in the program (each subroutine uses its own set of masks), typically small. (For DirectX 11 HLSL, D=64).

(b) For each basic block, for each variable v that needs blending, the first and last operations are accumulated where v is defined. If there are multiple definitions or there is a use of a newly created value, a helper variable may be used instead of the original variable to temporarily store the value. The temporary variable is initialized on first definition and blended directly after the last definition. This reduces the livetime of the value and helps the register allocator.

(c) In one embodiment, only blend (or store) variables that are live are used. Global liveness analysis can be used to determine live variable sets on exiting from each basic block.

(d) In addition, the compiler may be implemented to supports hints, inserted in the front-end, to indicate which variables need to be blended/predicated for vectorization. For example, most front-end generated helper variables do not need to be blended.

Using Active Element Mask

Some techniques may be used when handling a partial vector, that is, when there are fewer than W elements that need to be processed in a vector group. Instead of generating a special version of a vectorization region for partial vectors, thus doubling the IR size and compilation time, the active element mask is used to predicate inactive invocations. The mask is applied at every point where execution switches from non-predicated execution to predicated execution. Only the first component of a vector needs to be tested for uniform transfer and all components for divergent transfers. This allows for correct execution because inactive components have false predicates.

CONCLUSION

To review, a perhaps unusual technique with the vectorizer is actually exploiting parallelism (vectorizing computation) across independent elements, rather than exploiting parallelism among similar operations of a single elements—a traditional meaning of vectorization. Modern GPU hardware processes independent elements; however, there has not been any apparent need for such a vectorization type in software (on CPU, not GPU). That is, an HLSL shader (or OpenGL/OpenCL/CUDA kernel) is actually a program for one element, but the programming model also implies that there are many independent elements begin processed concurrently. This makes such vectorization possible and quite efficient; however, these programming models are fairly recent. Thus, the idea of compiler vectorization across independent elements as per the vectorization rules above (in order to run program efficiently by a CPU) has not been previously considered.

Embodiments and features discussed above can be realized in the form of information stored in volatile or non-volatile computer or device readable storage media. This is deemed to include at least physical storage media such as optical storage (e.g., compact-disk read-only memory (CD-ROM)), magnetic media, flash read-only memory (ROM), or any means of physically storing digital information (excluding carrier waves, signals per se, and the like). The stored information can be in the form of machine executable instructions (e.g., compiled executable binary code), source code, bytecode, or any other information that can be used to enable or configure computing devices to perform the various embodiments discussed above. This is also deemed to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The term media as used herein refers to physical devices and material and does not refer to signals per se, carrier waves, or any other transient forms of energy per se. The embodiments and features can be performed on any type of computing device, including portable devices, workstations, servers, mobile wireless devices, and so on.

The invention claimed is:

1. Method of vectorizing an input shader comprising shader code in a shading language using a central processing unit (CPU) with a vector width W, wherein the CPU is not a graphics processing unit (GPU), the method comprising:
receiving input intermediate language code compiled from the shader code, the input intermediate language code comprising divergent flow control and N elements, where N is greater than W; and
vectorizing independent elements in the input intermediate language code into output intermediate language code by analyzing the input intermediate language code to identify scopes of the input intermediate language code by inserting annotations in the input intermediate language code to annotate scopes as either predicated or non-predicated, and providing and managing scope masks for the predicated scopes, respectively, the providing including inserting looping mask variables into the output intermediate code, wherein the output intermediate language code, when compiled, is executed by the CPU such that the CPU concurrently processes W of the independent elements to produce vector values, and in accordance with the scope masks the CPU correctly merges the vector values.

2. A method according to claim 1, wherein the divergent flow control corresponds to a control flow construct in the shader program code, the control flow construct comprising either an if-statement, a switch statement, a subroutine call, a conditional subroutine call, or a loop statement.

3. A method according to claim 2, wherein the control flow construct comprises the if-statement, a scope mask for a scope of the if-statement comprises a true-branch mask and a false-branch mask, and the method further comprises, upon entry to the scope of the if-statement: setting the true-branch mask and the false-branch mask according to a condition of the if-statement and according to a scope mask of a parent scope that contains the scope of the if-statement.

4. A method according to claim 2, wherein the control flow construct comprises the switch statement which comprises a switch condition, case values of respective switch-case regions, and a default case comprising a switch-default region, wherein a scope mask for a scope of the switch statement comprises a selector mask, a take-default mask, and an initial-parent mask, and the method further comprises:
upon entering the scope of the switch statement, setting the selector mask to the switch condition, setting the take-default mask and initial-parent mask to a scope mask of a parent scope containing the scope of the switch statement.

5. A method according to claim 4, wherein the scope mask further comprises a main mask, and the method further comprising, upon entering a switch-case region: setting the main mask based on the selector mask and the case values, setting the main mask according to the main mask and parent scope mask, and setting the take-default mask according to a current value of the take-default mask and according to the main mask.

6. A method according to claim 5, further comprising, upon entering the switch-default region, setting the main mask to the take-default mask.

7. A method according to claim 2, wherein the control flow construct comprises the loop statement, wherein the mask comprises a keep-looping mask and a main mask, and the method further comprises:
upon entering the scope of the loop statement, declaring a variable for the keep-looping mask if the loop statement has a continue statement, otherwise aliasing the keep-looping mask to the main mask;
before the loop statement starts, initializing the keep-looping mask to a scope mask of a parent scope containing the scope of the loop statement; and
if the loop statement has a continue statement, adding a first operation to a body of the loop statement that is looped, wherein the added first operation updates the main mask according to the keep-looping mask.

8. A method according to claim 7, further comprising, upon exiting the body of the loop statement, setting the keep-looping mask according to the keep-looping mask and a loop condition value of the loop statement, and setting the loop condition value according to the keep-looping mask.

9. One or more computer-readable physical storage media storing information not in the form of a signal or carrier wave, the information enabling a computing device to perform a process, the process comprising:
transforming input intermediate representation (IR) code compiled from shader language source code to output IR code vectorized to fit a vector width of a central processing unit (CPU) that is not a graphics processing unit, the transforming comprising:
performing an analysis pass comprising analyzing the input IR code to identify scopes and to annotate operations as either predicated or non-predicated by inserting annotations within the input IR code, where predicated operations are provided with a mask inserted in the input IR code to merge output thereof, where each scope is annotated by a respective annotation as to whether it needs to declare and use a scope mask, parts of each scope are annotated with respective annotations inserted into the input IR code as to whether they use a protective branch, and each scope corresponding to an if-statement is annotated with respective annotations inserted into the input IR code indicating whether to predicate true and/or false branches, and
performing a vectorization pass using the scopes and annotations in the input IR code from the analysis pass, wherein some scopes are nested within other scopes that are parent scopes, and the scope mask of a scope is computed according to a corresponding type of the scope and according to a scope mask of a parent scope.

10. One or more computer-readable physical storage media according to claim 9, wherein the scope types comprise an if-scope, a switch-scope, and a loop-scope.

11. One or more computer-readable physical storage media according to claim 10, wherein for an if-scope type of scope, a corresponding scope mask has a true-branch flag and a false-branch flag which are each computed according to a parent scope mask and a condition of a corresponding if-statement, the true-branch flag and the false-branch flag controlling how if-statement is vectorized.

12. One or more computer-readable physical storage media according to claim 10, wherein for a switch-scope type of scope, a corresponding scope mask has default mask, an initial parent mask, and a selector mask, which are set according to a parent scope mask and a condition value of a switch statement corresponding to the switch-scope type of scope.

13. One or more computer-readable physical storage media according to claim 10, wherein for a loop-scope type of scope, the corresponding scope mask is computed according to a parent scope mask, whether a continue is present, and a keep-looping mask.

14. One or more computer-readable physical storage media according to claim 13, the scope mask computed further according to whether there is a break in the loop statement, whether there is a conditional break, and whether there is a conditional continue.

15. One or more computer-readable physical storage media according to claim 10, wherein the scope types further comprise a conditional subroutine call, an unconditional subroutine call, and a thread loop.

16. A computing device comprising a central processing unit (CPU) and storage storing information to perform a process of vectorizing an input shader comprising shader code in a shading language using the CPU with a vector width W, wherein the CPU is not a graphics processing unit (GPU), the process comprising:

receiving input intermediate language code compiled from a shader comprising shader program code, the input intermediate language code comprising divergent flow control and N elements, where N is greater than W; and vectorizing the input intermediate language code into output intermediate language code by analyzing the input intermediate language code and inserting annotations into the intermediate language code, automatically identifying scopes of the input intermediate language code, where scopes are annotated by respective annotations as to whether a scope mask is to be used, and providing and managing scope masks for the annotated scopes, respectively, the providing and managing including inserting the scope masks into the intermediate language code, wherein the output intermediate language code including inserted scope masks, when compiled, is executed by the CPU such that the CPU concurrently processes W of the independent elements to produce vector values, and in accordance with the scope masks the CPU correctly merges the vector values.

17. A computing device according to claim 16, the process further comprising using the scope masks to blend values in threads to produce W values for concurrent execution by the CPU.

18. A computing device according to claim 17, wherein the scopes correspond to basic blocks, and for each basic block, for each variable therein that is to be blended, first and last operations where a variable is defined are accumulated, and if there are multiple definitions or there is a use of a newly created value, a temporary helper variable is used instead of an original variable to temporarily store the value.

19. A computing device according to claim 17, wherein the scopes correspond to basic blocks, wherein only live variables of a basic block are blended, and a global analysis is used to determine live variable sets upon exit from each basic block.

20. A computing device according to claim 16, wherein the shader language code includes an operation on a single element that is modeled in the shader language as an implicit parallel operation on a plurality of elements, and the vectorizing produces corresponding independent vectorized elements.

* * * * *